(12) United States Patent
Zimmermann et al.

(10) Patent No.: US 6,655,802 B2
(45) Date of Patent: Dec. 2, 2003

(54) METHOD FOR PRODUCING EYEGLASSES

(75) Inventors: Martin Zimmermann, Kleinberghofen (DE); Peter Baumbach, München (DE); Walter Haimerl, München (DE); Herbert Pfeiffer, München (DE); Gregor Esser, München (DE); Jochen Brosig, Grünwald (DE); Werner Müller, Ötisheim (DE); Martin Wechs, München (DE); Helmut Altheimer, Lauchdorf (DE); Rainer Dorsch, München (DE); Winfried Nikolaus, Haar (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 10/019,877
(22) PCT Filed: Apr. 30, 2001
(86) PCT No.: PCT/DE01/01596
§ 371 (c)(1),
(2), (4) Date: Dec. 12, 2002
(87) PCT Pub. No.: WO01/84215
PCT Pub. Date: Nov. 8, 2001

(65) Prior Publication Data
US 2003/0107705 A1 Jun. 12, 2003

(30) Foreign Application Priority Data
Apr. 28, 2000 (DE) .......................... 100 21 047
Apr. 28, 2000 (DE) .......................... 100 20 576
Jan. 17, 2001 (WO) ................ PCT/DE01/00188

(51) Int. Cl.$^7$ ................................. G02C 7/06
(52) U.S. Cl. ....................... 351/169; 351/177
(58) Field of Search ................ 351/168–172, 351/177

(56) References Cited
U.S. PATENT DOCUMENTS
5,444,503 A 8/1995 Kelch et al.
5,992,998 A 11/1999 Pfeiffer et al.
2002/0176049 A1 * 11/2002 Sakai et al. ........... 351/177

FOREIGN PATENT DOCUMENTS
| DE | 43 37 369 A1 | 5/1995 |
| DE | 197 01 312 A1 | 7/1998 |
| DE | 197 01 312 A 1 | 7/1998 |
| EP | 0 880 046 A1 | 11/1998 |

OTHER PUBLICATIONS

"Multigressiv: Die Vervollkommnung," *Trade Journal DOZ*, pp. 44–46 (Aug. 1996).
Stollenwerk, G., "Korrekte Horizontalzentrierung von Gleitsicht–Grillengläsern," *Trade Journal NOJ*, pp. 18, 20, 22, 24, 26 & 28 (Nov. 1997).

\* cited by examiner

Primary Examiner—Scott J. Sugarman
(74) Attorney, Agent, or Firm—Ladas & Parry

(57) ABSTRACT

What is described here is a method of manufacturing spectacles comprising individual progressive ophthalmic lenses, including the following steps:
- selection of a spectacle frame,
- detection of the shape of the lens rings with a precision better than ±0.5 mm in the x- and y-directions (data set 1),
- detecting the intersection points of the lines of sight through the plane of the lens rings for at least two design distances of the progressive ophthalmic lenses with a precision better than ±1 mm (data set 2)
- selection and positioning relative to the lens rings of a spherical or non-spherical surface in view of the prescription data, using the data sets 1 and 2 (data set 3),
- computing and positioning the progressive surface relative to the selected surface, with minimization of the critical thickness of the ophthalmic lens, using the data sets 1 to 3 (data set 4),
- manufacturing the progressive surfaces as well as edges of the ophthalmic lenses from a non-edged semi-finished product finished on one side, using the data sets 1 to 4.

16 Claims, 20 Drawing Sheets

Pfeilhöhen:

| | 0 | -20 | -17,5 | -15 | -12,5 | -10 | -7,5 | -5 | -2,5 | 0 |
|---|---|---|---|---|---|---|---|---|---|---|
| 20 | 0 | 0 | 0 | 0 | 0 | 0 | 0 | 0 | 0 | 0 |
| 17,5 | 0 | 0 | 0 | 0 | 0 | 0 | 0 | 0 | 0 | 1,063159 |
| 15 | 0 | 0 | 0 | 0 | 0 | 1,545607 | 1,713431 | 1,559597 | 1,463879 | 1,426279 |
| 12,5 | 0 | 0 | 0 | 1,817928 | 1,814691 | 1,224321 | 1,334283 | 1,180808 | 1,085335 | 1,047946 |
| 10 | 0 | 0 | 1,817928 | 1,551597 | 1,492398 | 0,960937 | 1,013638 | 0,860507 | 0,785194 | 0,727941 |
| 7,5 | 0 | 0 | 1,720774 | 1,34152 | 1,22773 | 0,754825 | 0,751121 | 0,596481 | 0,503342 | 0,466141 |
| 5 | 0 | 0 | 1,563111 | 1,196309 | 1,019638 | 0,604259 | 0,546206 | 0,394455 | 0,2997 | 0,262563 |
| 2,5 | 0 | 0 | 1,457542 | 1,083604 | 0,868886 | 0,50814 | 0,397983 | 0,247914 | 0,154101 | 0,117244 |
| 0 | 1,830565 | 0 | 1,40174 | 1,031453 | 0,76743 | 0,464354 | 0,305203 | 0,158065 | 0,066241 | 0,030034 |
| -2,5 | 0 | 0 | 1,393847 | 1,027636 | 0,719197 | 0,471125 | 0,266129 | 0,123429 | 0,035094 | 0,000481 |
| -5 | 0 | 0 | 1,431506 | 1,070482 | 0,720335 | 0,526155 | 0,278936 | 0,142058 | 0,058561 | 0,026865 |
| -7,5 | 0 | 0 | 1,513988 | 1,158641 | 0,768893 | 0,627413 | 0,340932 | 0,210864 | 0,133127 | 0,105253 |
| -10 | 0 | 0 | 0 | 1,291739 | 0,863288 | 0,773978 | 0,449478 | 0,328492 | 0,254673 | 0,230694 |
| -12,5 | 0 | 0 | 0 | 1,470887 | 1,002913 | 0,96633 | 0,603099 | 0,486693 | 0,420087 | 0,399381 |
| -15 | 0 | 0 | 0 | 0 | 1,18868 | 0,801624 | 0,690475 | 0,8277 | 0,609175 | | 
| -15 | 0 | 0 | 0 | 0 | 1,18868 | 0,801624 | 0,690475 | 0,8277 | 0,609175 |
| -17,5 | 0 | 0 | 0 | 0 | 1,421637 | 1,204619 | 1,044387 | 0,938771 | 0,876431 | 0,659052 |
| -20 | 0 | 0 | 0 | 0 | 0 | 0 | 1,330393 | 1,224673 | 1,165587 | 1,144724 |
| | 0 | 0 | 0 | 0 | 0 | 0 | 0 | 0 | 0 | 1,478348 |

| | 0 | 2,5 | 5 | 7,5 | 10 | 12,5 | 15 | 17,5 | 20 |
|---|---|---|---|---|---|---|---|---|---|
| 20 | 0 | 0 | 0 | 0 | 0 | 0 | 0 | 0 | 0 |
| 17,5 | 0 | 0 | 0 | 0 | 0 | 0 | 0 | 0 | 0 |
| 15 | 1,446742 | 1,525089 | 1,660949 | 0 | 0 | 0 | 0 | 0 | 0 |
| 12,5 | 1,068824 | 1,14714 | 1,283004 | 1,475621 | 1,724487 | 0 | 0 | 0 | 0 |
| 10 | 0,748901 | 0,827434 | 0,96318 | 1,155306 | 1,403207 | 1,708598 | 0 | 0 | 0 |
| 7,5 | 0,487156 | 0,565796 | 0,701157 | 0,892405 | 1,138875 | 1,440352 | 1,708598 | 0 | 0 |
| 5 | 0,283629 | 0,362012 | 0,496472 | 0,686141 | 0,930483 | 1,229496 | 1,440352 | 1,563527 | 0 |
| 2,5 | 0,138174 | 0,215724 | 0,348404 | 0,535528 | 0,776835 | 1,072602 | 1,229496 | 1,423349 | 0 |
| 0 | 0,050949 | 0,126498 | 0,258084 | 0,439204 | 0,676165 | 0,967619 | 1,077602 | 1,314241 | 0 |
| -2,5 | 0,020553 | 0,09362 | 0,218612 | 0,396033 | 0,627053 | 0,912895 | 0,967619 | 1,254395 | 1,652185 |
| -5 | 0,046367 | 0,115871 | 0,235083 | 0,405233 | 0,628553 | 0,907447 | 0,912895 | 1,242888 | 0 |
| -7,5 | 0,124772 | 0,190572 | 0,303627 | 0,465825 | 0,680542 | 0,950999 | 0,907447 | 1,278758 | 0 |
| -10 | 0,251041 | 0,313835 | 0,421376 | 0,578191 | 0,782252 | 1,043815 | 0,950999 | 1,353169 | 0 |
| -12,5 | 0,420719 | 0,481895 | 0,585365 | 0,734297 | 0,932838 | 1,13112 | 1,043815 | 0 | 0 |
| -15 | 0,631287 | 0,691979 | 0,793141 | 0,938177 | 1,185658 | 1,375067 | 1,165937 | 0 | 0 |
| -17,5 | 0,861609 | 0,942421 | 1,04282 | 1,333105 | 0 | 0 | 1,377177 | 0 | 0 |
| -20 | 1,171396 | 1,232634 | 0 | 0 | 0 | 0 | 0 | 0 | 0 |

Pfeilhöhen:

| | 0 | -20 | -17,5 | -15 | -12,5 | -10 | -7,5 | -5 | -2,5 | 0 |
|---|---|---|---|---|---|---|---|---|---|---|
| 20 | 0 | 0 | 0 | 0 | 0 | 0 | 0 | 0 | 0 | 0 |
| 17,5 | | 0 | 0 | 0 | 0 | 0 | 0 | 0 | 0 | 1,483192 |
| 15 | | 0 | 0 | 0 | 0 | 0 | 1,351751 | 1,230516 | 1,154267 | 1,123188 |
| 12,5 | | 0 | 0 | 1,435241 | 1,432649 | 1,222377 | 1,056285 | 0,934816 | 0,858412 | 0,827363 |
| 10 | | 0 | 0 | 1,227201 | 1,181539 | 0,971452 | 0,80533 | 0,683694 | 0,607109 | 0,576043 |
| 7,5 | | 0 | 1,35686 | 1,061981 | 0,974334 | 0,764837 | 0,599018 | 0,477446 | 0,400755 | 0,369618 |
| 5 | | 0 | 1,231614 | 0,938551 | 0,810421 | 0,602142 | 0,437275 | 0,316257 | 0,239735 | 0,208596 |
| 2,5 | | 0 | 1,145583 | 0,854972 | 0,688921 | 0,48261 | 0,319572 | 0,200009 | 0,124279 | 0,093338 |
| 0 | | 1,428494 | 1,096785 | 0,809336 | 0,608102 | 0,404841 | 0,24496 | 0,12822 | 0,054403 | 0,024064 |
| -2,5 | | 0 | 1,083532 | 0,800003 | 0,566173 | 0,367188 | 0,211947 | 0,099648 | 0,029303 | 0,000479 |
| -5 | | 0 | 1,10447 | 0,825692 | 0,561595 | 0,368122 | 0,218933 | 0,112509 | 0,047001 | 0,020916 |
| -7,5 | | 0 | 1,158712 | 0,865421 | 0,592805 | 0,405729 | 0,263502 | 0,163875 | 0,104027 | 0,081486 |
| -10 | | 0 | 0 | 0,905653 | 0,658653 | 0,478363 | 0,343326 | 0,25058 | 0,198349 | 0,177314 |
| -12,5 | | 0 | 0 | 0,979146 | 0,758828 | 0,585318 | 0,457079 | 0,37049 | 0,320968 | 0,304702 |
| -15 | | 0 | 0 | 1,108029 | 0,894145 | 0,726942 | 0,604462 | 0,522685 | 0,476302 | 0,46173 |
| -17,5 | | 0 | 0 | 0 | 1,065304 | 0,90314 | 0,784706 | 0,705826 | 0,661476 | 0,647667 |
| -20 | | 0 | 0 | 0 | 0 | 0 | 0,996895 | 0,919563 | 0,876091 | 0,862511 |
| | | | | | | | | | | 1,108712 |

| | 0 | 2,5 | 5 | 7,5 | 10 | 12,5 | 15 | 17,5 | 20 |
|---|---|---|---|---|---|---|---|---|---|
| 20 | 0 | 0 | 0 | 0 | 0 | 0 | 0 | 0 | 0 |
| 17,5 | | 1,137299 | 1,195414 | 1,300991 | 0 | 0 | 0 | 0 | 0 |
| 15 | | 0,841728 | 0,901269 | 1,005406 | 1,153389 | 1,344503 | 1,327145 | 0 | 0 |
| 12,5 | | 0,590642 | 0,650549 | 0,754992 | 0,903076 | 1,09398 | 1,118987 | 0 | 0 |
| 10 | | 0,384431 | 0,444568 | 0,549005 | 0,696743 | 0,886902 | 0,953043 | 1,22513 | 0 |
| 7,5 | | 0,223489 | 0,283548 | 0,3874 | 0,534022 | 0,722666 | 0,828231 | 1,097849 | 0 |
| 5 | | 0,108139 | 0,167477 | 0,269782 | 0,414245 | 0,600403 | 0,742766 | 1,009047 | 0 |
| 2,5 | | 0,038523 | 0,096156 | 0,195487 | 0,336256 | 0,518581 | 0,69515 | 0,95711 | 1,261866 |
| 0 | | 0,014248 | 0,068934 | 0,163658 | 0,298981 | 0,475882 | 0,684467 | 0,941018 | 0 |
| -2,5 | | 0,033792 | 0,084599 | 0,173402 | 0,301649 | 0,471495 | 0,710451 | 0,960427 | 0 |
| -5 | | 0,093825 | 0,140525 | 0,222954 | 0,343364 | 0,505026 | 0,773454 | 1,015905 | 0 |
| -7,5 | | 0,189843 | 0,233084 | 0,309789 | 0,42263 | 0,57621 | 0,873797 | 0 | 0 |
| -10 | | 0,317756 | 0,358953 | 0,431424 | 0,538505 | 0,684523 | 1,011708 | 0 | 0 |
| -12,5 | | 0,475298 | 0,515786 | 0,555814 | 0,688904 | 0,829288 | 0 | 0 | 0 |
| -15 | | 0,661588 | 0,702177 | 0,711337 | 0,872168 | 1,008931 | 0 | 0 | 0 |
| -17,5 | | 0,876573 | 0,917681 | 0,968887 | 0 | 0 | 0 | 0 | 0 |
| -20 | | 0 | 0 | 0 | 0 | 0 | 0 | 0 | 0 |

Pfeilhöhen:

| | 0 | -17,5 | -15 | -12,5 | -10 | -7,5 | -5 | -2,5 | 0 |
|---|---|---|---|---|---|---|---|---|---|
| 20 | 0 | 0 | 0 | 0 | 0 | 0 | 0 | 0 | 0 |
| 17,5 | 0 | 0 | 0 | 0 | 0 | 0 | 0 | 1,303651 | 1,659511 |
| 15 | 0 | 0 | 0 | 0 | 0 | 1,50138 | 1,379958 | 0,967554 | 1,272636 |
| 12,5 | 0 | 0 | 1,511323 | 1,542449 | 1,331838 | 1,185525 | 1,043953 | 0,682506 | 0,936603 |
| 10 | 0 | 0 | 1,275555 | 1,257288 | 1,046964 | 0,880706 | 0,759034 | 0,448755 | 0,651567 |
| 7,5 | 0 | 1,384017 | 1,088928 | 1,022451 | 0,812796 | 0,646908 | 0,525351 | 0,266564 | 0,417772 |
| 5 | 0 | 1,243534 | 0,950325 | 0,837204 | 0,628823 | 0,463931 | 0,342966 | 0,13607 | 0,235592 |
| 2,5 | 0 | 1,148451 | 0,857733 | 0,700575 | 0,49419 | 0,331148 | 0,211657 | 0,057195 | 0,105312 |
| 0 | 1,428472 | 1,096717 | 0,809173 | 0,610758 | 0,407419 | 0,24752 | 0,130852 | 0,029052 | 0,027055 |
| -2,5 | 0 | 1,086557 | 0,802936 | 0,565888 | 0,366782 | 0,211471 | 0,099215 | 0,049592 | 0,000481 |
| -5 | 0 | 1,110483 | 0,837507 | 0,564317 | 0,370841 | 0,221298 | 0,11488 | 0,115297 | 0,023896 |
| -7,5 | 0 | 1,185454 | 0,911829 | 0,604327 | 0,416932 | 0,274467 | 0,174837 | 0,222187 | 0,093357 |
| -10 | 0 | 0 | 1,025783 | 0,684631 | 0,503912 | 0,368602 | 0,275938 | 0,387378 | 0,203995 |
| -12,5 | 0 | 0 | 1,180632 | 0,804908 | 0,63094 | 0,502494 | 0,416174 | 0,549413 | 0,352221 |
| -15 | 0 | 0 | 0 | 0,966146 | 0,798586 | 0,676059 | 0,594688 | 0,787439 | 0,53619 |
| -17,5 | 0 | 0 | 0 | 1,169289 | 1,006916 | 0,888686 | 0,810566 | 1,021001 | 0,75515 |
| -20 | 0 | 0 | 0 | 0 | 0 | 1,139476 | 1,063086 | 0 | 1,009067 |
| | 0 | 0 | 0 | 0 | 0 | 0 | 0 | 0 | 1,298354 |

| | 0 | 2,5 | 5 | 7,5 | 10 | 12,5 | 15 | 17,5 | 20 |
|---|---|---|---|---|---|---|---|---|---|
| 20 | 0 | 0 | 0 | 0 | 0 | 0 | 0 | 0 | 0 |
| 17,5 | 0 | 1,286928 | 1,346322 | 1,450361 | 0 | 0 | 0 | 0 | 0 |
| 15 | 0 | 0,951153 | 1,010952 | 1,115402 | 1,263729 | 1,455195 | 0 | 0 | 0 |
| 12,5 | 0 | 0,668353 | 0,728494 | 0,831205 | 0,979561 | 1,170717 | 1,404099 | 0 | 0 |
| 10 | 0 | 0,432766 | 0,49312 | 0,597781 | 0,745722 | 0,93604 | 1,168227 | 0 | 0 |
| 7,5 | 0 | 0,250871 | 0,310929 | 0,414968 | 0,561729 | 0,750443 | 0,980815 | 1,252824 | 0 |
| 5 | 0 | 0,120303 | 0,179833 | 0,282288 | 0,42883 | 0,612975 | 0,840698 | 1,110129 | 0 |
| 2,5 | 0 | 0,041724 | 0,099567 | 0,199042 | 0,33984 | 0,522071 | 0,746055 | 1,012047 | 0 |
| 0 | 0 | 0,014532 | 0,069517 | 0,164418 | 0,299733 | 0,476453 | 0,695415 | 0,956982 | 1,261273 |
| -2,5 | 0 | 0,037234 | 0,085517 | 0,177598 | 0,305833 | 0,475407 | 0,687952 | 0,94399 | 0 |
| -5 | 0 | 0,106518 | 0,153939 | 0,236827 | 0,357304 | 0,518642 | 0,723519 | 0,972842 | 0 |
| -7,5 | 0 | 0,217754 | 0,263028 | 0,339427 | 0,452722 | 0,605842 | 0,802481 | 1,044176 | 0 |
| -10 | 0 | 0,366784 | 0,409332 | 0,482737 | 0,590319 | 0,736259 | 0,924994 | 0 | 0 |
| -12,5 | 0 | 0,551412 | 0,593445 | 0,664619 | 0,768447 | 0,908996 | 1,091047 | 0 | 0 |
| -15 | 0 | 0,770786 | 0,813003 | 0,883481 | 0,985229 | 1,123374 | 0 | 0 | 0 |
| -17,5 | 0 | 1,024961 | 1,067625 | 1,138261 | 0 | 0 | 0 | 0 | 0 |
| -20 | 0 | 0 | 0 | 0 | 0 | 0 | 0 | 0 | 0 |

METHOD FOR PRODUCING EYEGLASSES

FIELD OF THE INVENTION

The present invention relates to a method of manufacturing spectacles presenting individualized progressive ophthalmic lenses.

PRIOR ART

In a number of prior art documents—in this context exemplary reference is made to the German Patent DE-A-43 37 369, the trade journal DOZ August 1996, pages 44 to 46, the trade journal NOJ November 1997, from page 18 onwards, or the German Patent DE-A-197 01 312—it has been proposed to compute and manufacture individualized progressive ophthalmic lenses. This term is meant to be understood in the sense that the progressive area and/or an aspheric matching surface are individually computed in correspondence with the respective prescription data and other characteristics such as forward inclination, cornea/apex distance, etc.

An adaptation of the progressive ophthalmic lens to the spectacle frame or the frame shape is not considered in these prior art references.

Even though it is common to minimize the critical thickness of ophthalmic lenses—i.e. the center thickness in the case of lenses with a positive effect or the marginal thickness in the case of lenses with a negative effect—by an appropriate selection of the position of the prescription area, only the position of the two areas relative to each other is optimized exclusively for a minimization of the critical thickness, but not the shape of the prescription or adaptation area, respectively.

BRIEF DESCRIPTION OF THE INVENTION

The present invention is based on the problem of providing a method of manufacturing spectacles comprising individualized ophthalmic lenses matched with the respectively chosen spectacle frame.

One inventive solution to this problem is defined in patent claim 1. Improvements of the invention are the subject matters of the dependent claims.

The inventive method of manufacturing spectacles with individualized progressive ophthalmic lenses adapted to the frame shape comprises the following steps:

Initially, the wearer of the glasses must select a spectacle frame he likes. The shape of the lens rings of this spectacle frame is detected with a precision better than +/−0.5 mm in the x- and y-directions, i.e. in the direction of the frame plane (data set 1). This data set can be generated either by scanning the spectacle frame by means of a so-called tracer, or by detecting the shape of the spectacle frame by means of a scanner or an optical detector instrument, respectively, without contact. It is, of course, also possible to inquire the shape of the lens rings from the manufacturer of the respective spectacle frame and to incorporate the manufacturer's data into the inventive method as well. In an alternative approach, the contour of the pattern disks can also be considered.

Moreover, the intersection points of the lines of sight through the plane of the lens rings is detected for at least two design distances of the progressive ophthalmic lenses with a precision better than +/−1 mm (data set 2).

In a progressive ophthalmic lens designed for normal applications, the design distances are "infinite" in one case and in the other case a close-range distance, e.g. 33 cm. With a progressive ophthalmic lens adapted for a particular application, other design distances may be present, of course; for spectacles adapted for computer monitor work, for example, the design distances were roughly 1 m in the first case and roughly 40 cm in the other case.

The detection of the intersection points for the respective design distances is known from prior art so that it need not be discussed in more details here.

These two steps of the method are known from prior art and are carried out by an ophthalmic optician as routine work when spectacles with progressive ophthalmic lenses are adapted to the wearer.

In distinction from the method so far adopted, the selection and positioning relative to the lens rings of a spherical or non-spherical surface is performed not only in view of the prescription data but also with application of the data sets 1 and 2, i.e. in consideration of the shape of the lens rings and the points of intersection of the lines of sight through the plane of the lens rings. In other terms, among "blanks" held in stock, for example—i.e. blanks finished on one side—that particular blank is selected that is best suitable not only with respect to the prescription data but also in view of the shape of the lens rings and the position of the points of intersection for the individually computed progressive ophthalmic lens.

Subsequently, a progressive area is computed with minimization of the critical thickness of the ophthalmic lens and with application of the data sets 1 to 3. The computation, i.e. the optimization of the progressive area—starting out from an initial area—may be carried out by conventional methods so that this step need not be discussed in more details here.

Then, the progressive area is manufactured and the ophthalmic lens is framed, using a semi-finished product finished on one side and without an edge, with application of the generated data sets.

It is a particular advantage when the area finished on one side is a spherical or non-spherical face area because this area can be better adapted to the course of the spectacle frame, specifically in the z-direction, i.e. in the direction orthogonal on the frame plane—in distinction from the progressive area.

For this reason it is particularly preferred that the shape of the lens rings in the z-direction be determined, particularly with a precision better than +/−0.5 mm. The shape of the lens rings is then also input into the data set 1.

Another improvement of the quality of the ophthalmic lens is achieved by the provision that the detection of the point of intersection of the lines of sight through the plane of the lens rings and the arrangement of the lens rings in front of the wearer's eyes is detected with a precision better than +/−0.5 mm in the x-, y- and z-directions.

It is particularly preferable that the shape of the face area and particularly the course be selected as a function of the shape of the lens rings. To this end, the face area may be a non-spherical area and particularly an area presenting two differently designed principal sections whose shape is selected as a function of the shape of the lens rings. In other terms, according to the invention a toric or non-toric area is used also when the prescription data does not require the use of a torus, so as to be able to achieve an optimum adaptation to the course of the lens rings. The astigmatism introduced by the torically or non-torically designed surface, which is actually undesirable, is then compensated by a corresponding surface astigmatism of the progressive area on the side of the eyes so that the total astigmatism—with consideration of the astigmatism of oblique bundles in the application position—will correspond to the prescription values.

For the computation of the progressive lenses the following approach may be taken in particular:

In correspondence with prior art, the manufacturers of ophthalmic lenses use a product-dependent standard value of roughly 22 mm for the progression length L of continuous vision lenses.

For frames with a small disk height, some manufacturers offer special additional progression lengths shorter than the standard.

From prior art not any method is known that determines the progression length of a continuous vision lens in consideration of the cornea/apex distance (HSA) of the pre-adapted frame.

A standard progression length of 22 mm creates inexpedient effects as soon as the cornea/apex distance exceeds or drops below a defined mean value (15 mm) and hence the ophthalmic lens is no longer seated correctly in front of the point of rotation of the eyes in correspondence with an empirically determined position of use.

In accordance with the empirically determined position of use, an invariable progression length of 22 mm is the optimum only in the case of a mean HSA value of 15 mm. With smaller HSA values, the view must be lowered farther down while with a higher HSA value the point of reference in the near viewing range is reached with a slighter deflection of the line of sight already.

In correspondence with values gathered from experience, a lowering of the view relative to the horizontal deflection of the view by roughly 32 degrees occurs in reading. When the HSA in correspondence with the selected frame of the ultimate user is changed relative to the standard HSA value the deflection of the line of sight for achieving the full addition or for viewing through the point of reference in the near vision range $B_N$ does no longer correspond to the empirically determined position of use. This may enforce a posture of the head or deflection of the eyes, which may be troublesome for the wearer of the continuous vision lenses. With a smaller HSA value (e.g. 10 mm) the head or the eyes must be moved down (if this is possible at all) whilst with a higher HSA value (e.g. 20 mm) the head or the eyes must be raised in an unnatural manner.

In accordance with the present invention therefore a method is provided that is suitable to determine the optimum and individual progression length of the continuous vision lens by reference to the measured cornea/apex distance of a pre-adapted spectacle frame.

This problem is solved by the following steps:

(a) providing the value of the individual cornea/apex distance (HSA) of a pre-adapted spectacle frame, (b) measuring the individual distance d between a point of reference in the distant vision range $B_F$ and a centering marker $Z_K$, (c) determining the optimum and individualized progression length ($L_{opt}$) in correspondence with the following formula:

$$L_{opt}=0.63*(HSA+13.5 \text{ mm})+d(B_F, Z_K).$$

The progression length so determined may be communicated to the lens manufacturer who produces then a continuous vision lens with this individualized progression length.

BRIEF DESCRIPTION OF THE DRAWING

In the following, the invention will be described, without any limitation of the general inventive idea, by exemplary embodiments with reference to the drawing that is, in all other respects, explicitly referred to as far as the disclosure of all inventive particulars is concerned which are not explained in more details in the text. In the drawing:

FIGS. 1a–4a show the sagittae of four embodiments of the invention;

FIGS. 1b–4b illustrate the iso lines of the astigmatic departure;

FIGS. 1c–4c show the iso lines of the mean value in use;

FIGS. 1d–4d illustrate the iso lines of the surface astigmatism;

FIGS. 1e–4e indicate the iso lines of the mean surface power for inventive ophthalmic lenses.

DESCRIPTION OF EMBODIMENTS

In all four illustrated embodiments the progressive surface is the surface on the side of the eyes, without any restriction of the general applicability. The face area is a spherical or toric surface.

All four embodiments share the common aspect that they produce a spherical effect (mean value in use) of −1 dpt and an addition of 2 dpt in the point of reference in the distant vision range. An astigmatism prescription does not exist. In all figures the abscissa (x-axis) corresponds to the horizontal axis while the ordinate (y-axis) corresponds to the vertical axis in the position of use.

The reference points in the distant and near vision ranges are illustrated by respective circles in the corresponding Figures b to e whilst the cross marks the centering point and their position can be seen in the respective figures. Moreover, the course of the principal line, which has been determined in correspondence with the present invention, is drawn in the figures.

The sub-figures (a) illustrate the sagittae of the progressive area on the side of the eyes for the respective embodiment. The sagitta is to be understood to denote the distance of a point having the coordinates x and y (horizontal or vertical axis in the position of use of the ophthalmic lens) from the tangential plane of the surface apex. In the respective left columns in the Tables the y-values (from −20 to +20 mm) have been entered while in the topmost line from column 2 onwards the x-values (from −20 to +20 mm) are entered. The sagittae are equally indicated in millimeters. The value 0 means that no sagitta is indicated for these x-,/y-coordinates.

Figure 1A:
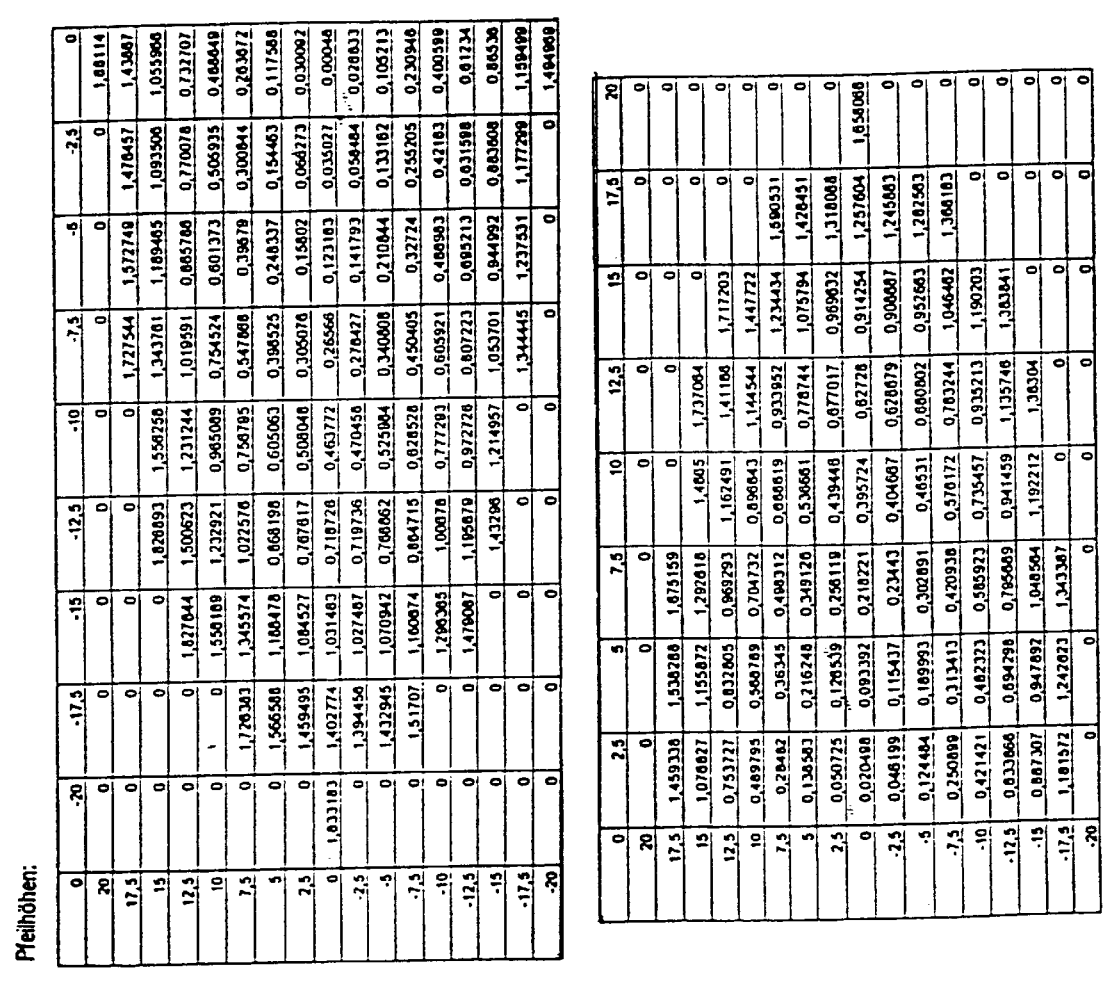
Figure 1B:
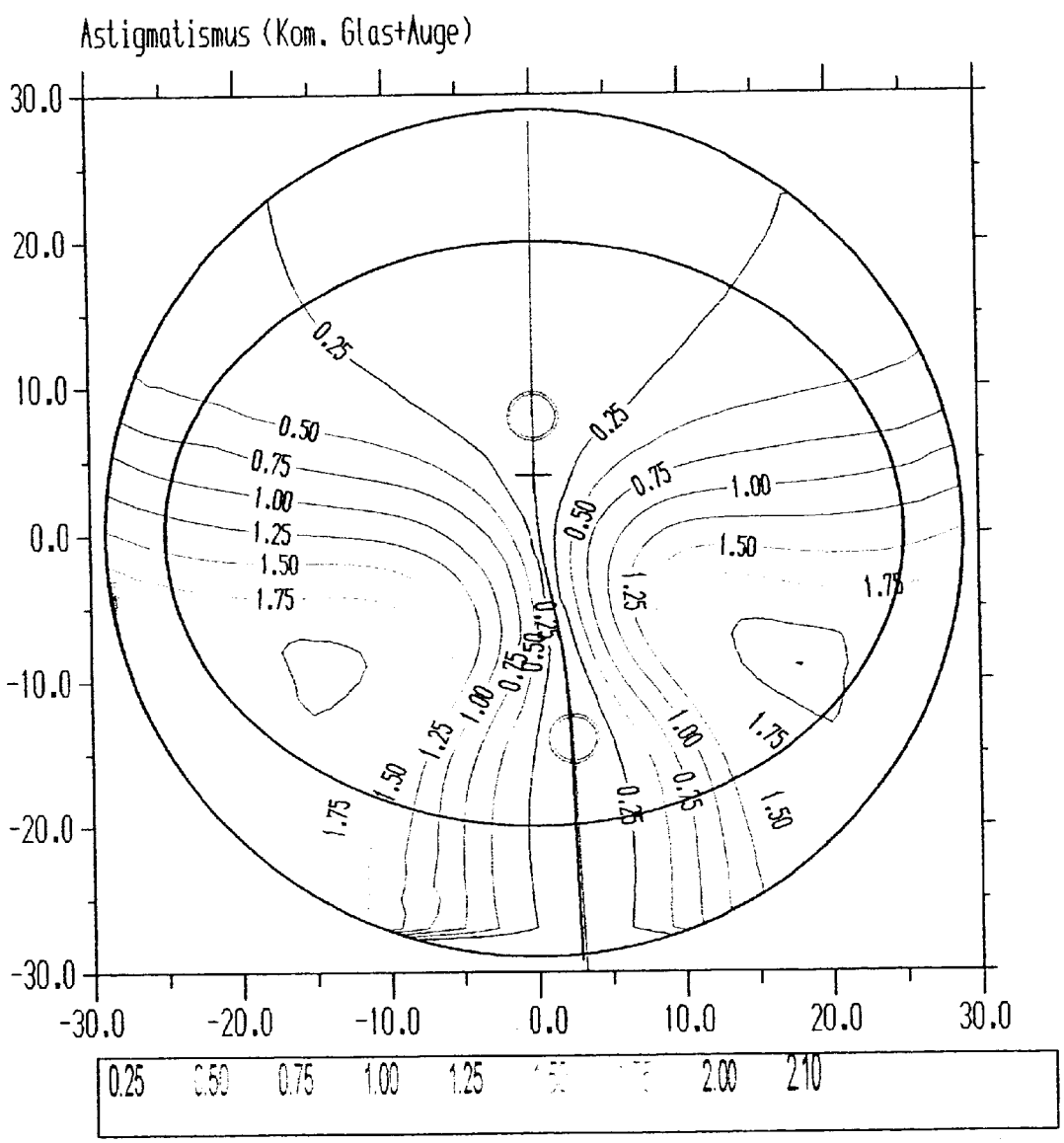
Figure 1C:
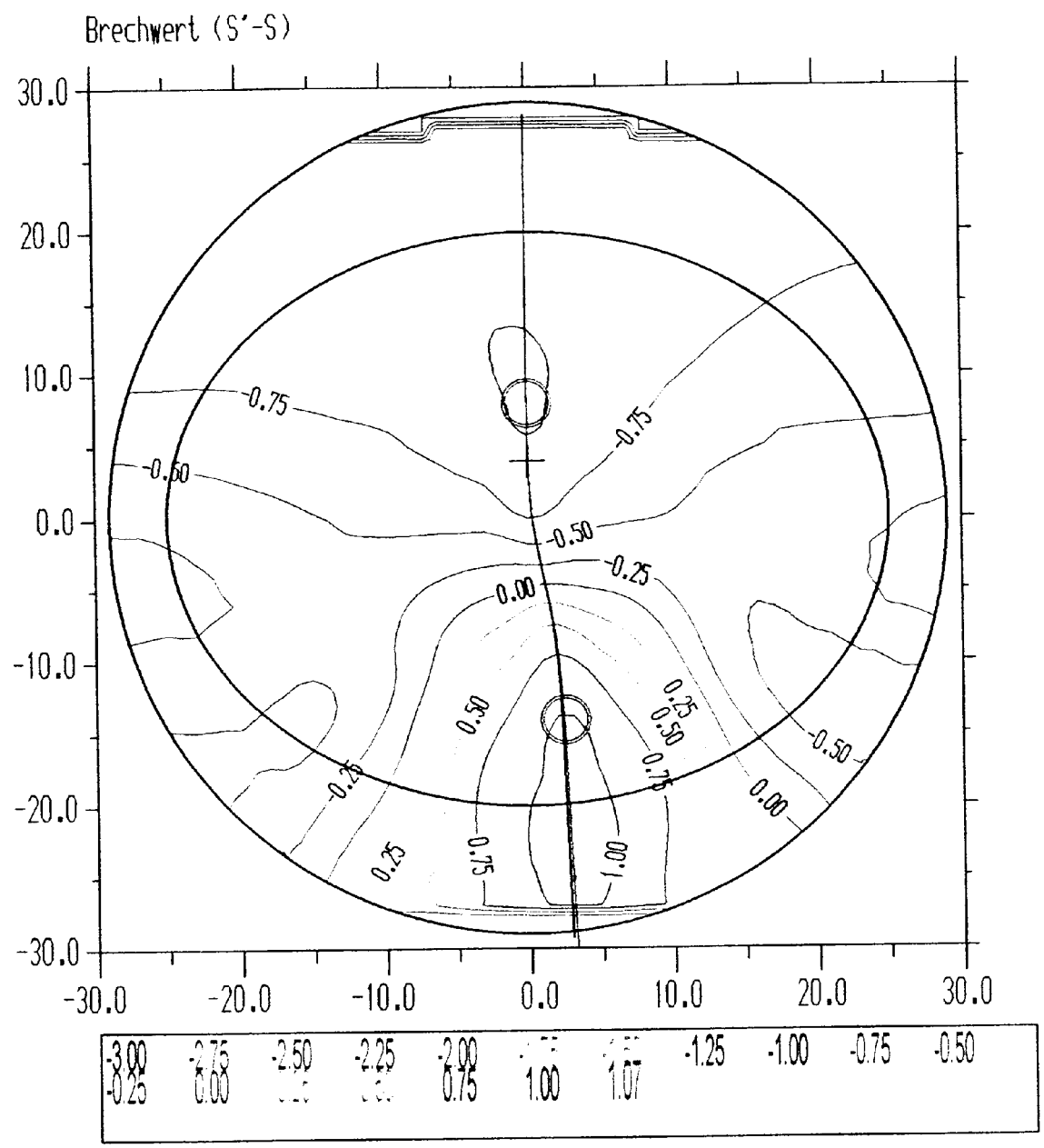
Figure 1D:
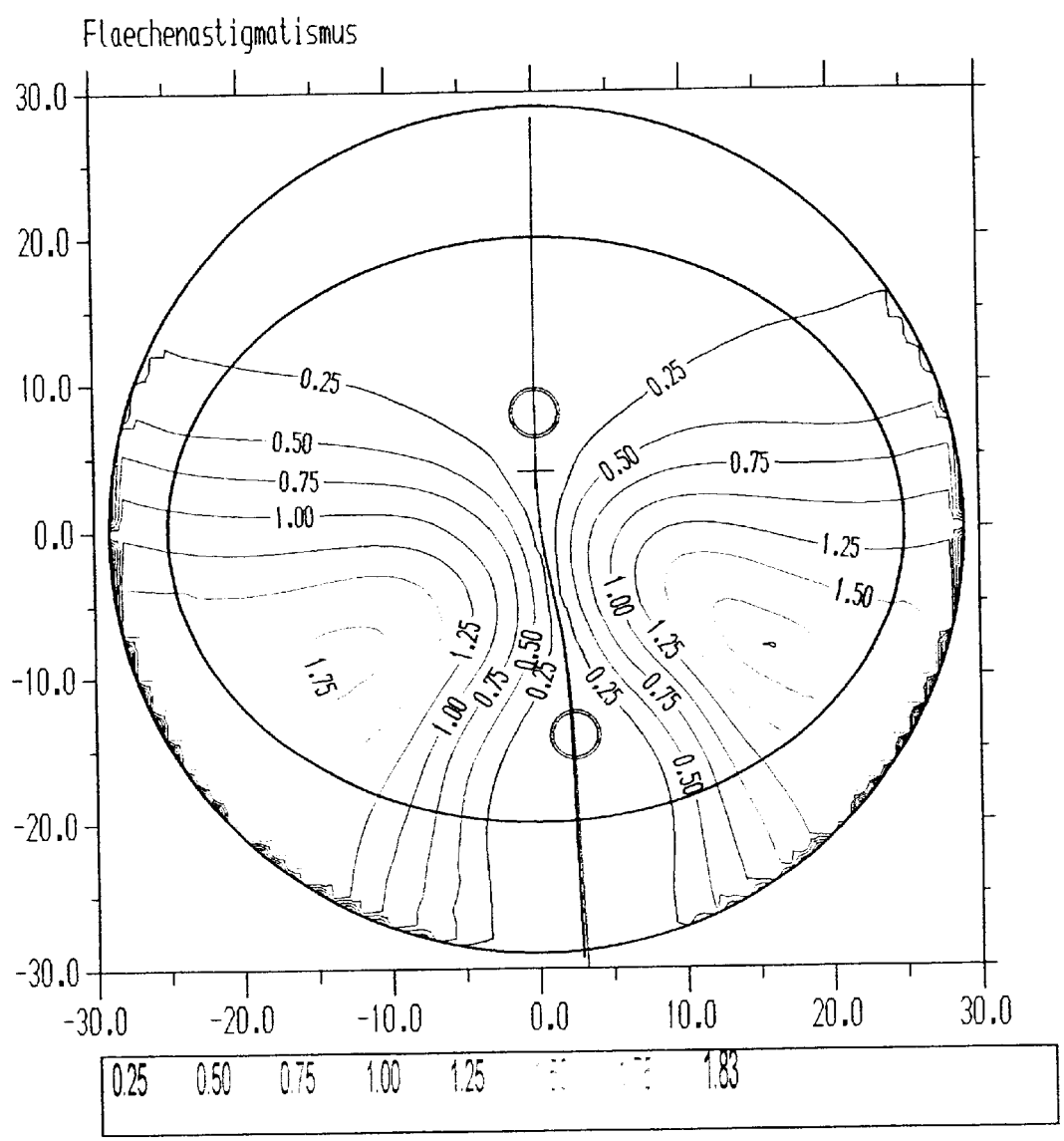
Figure 1E:
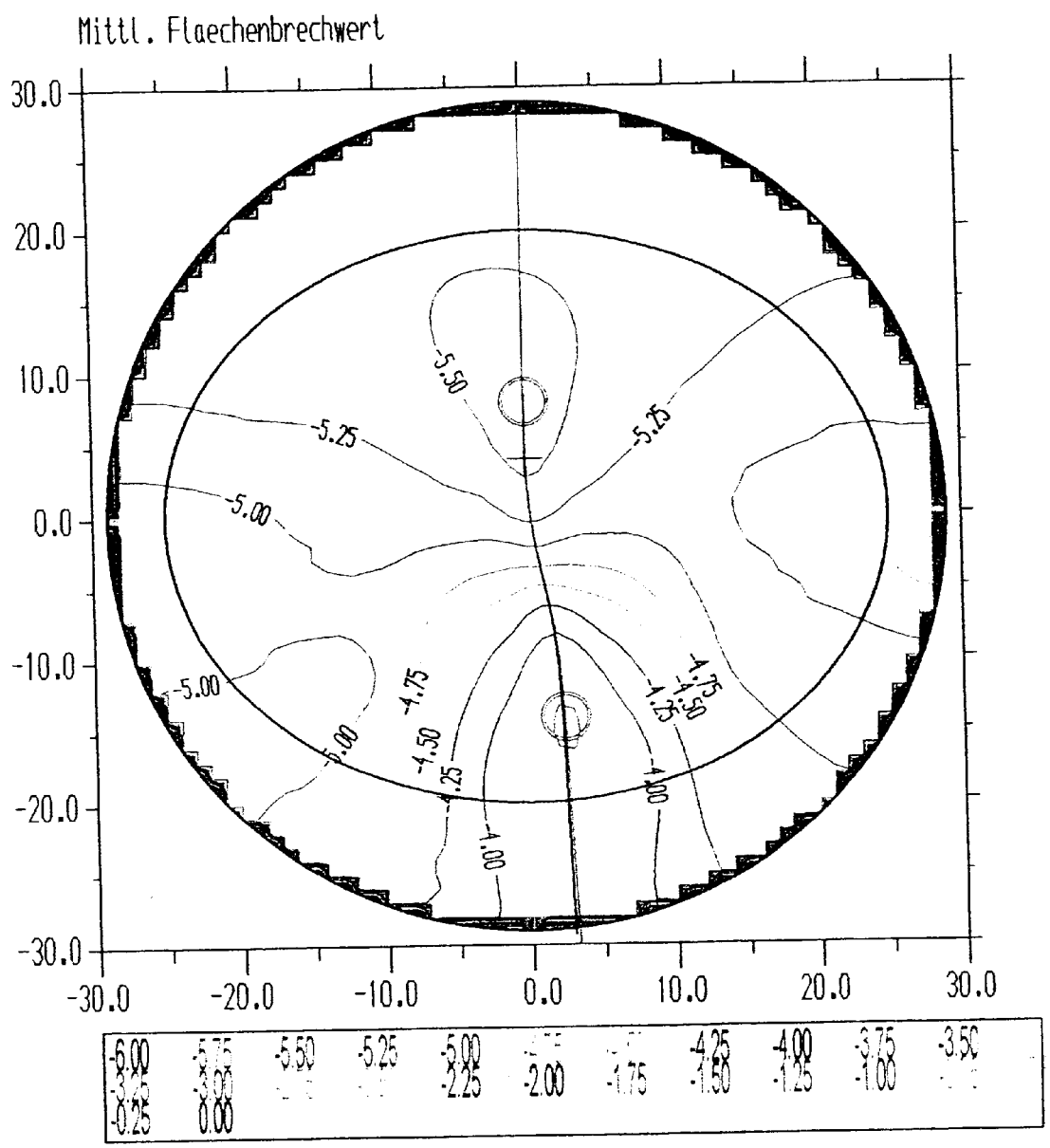
Figure 2B:
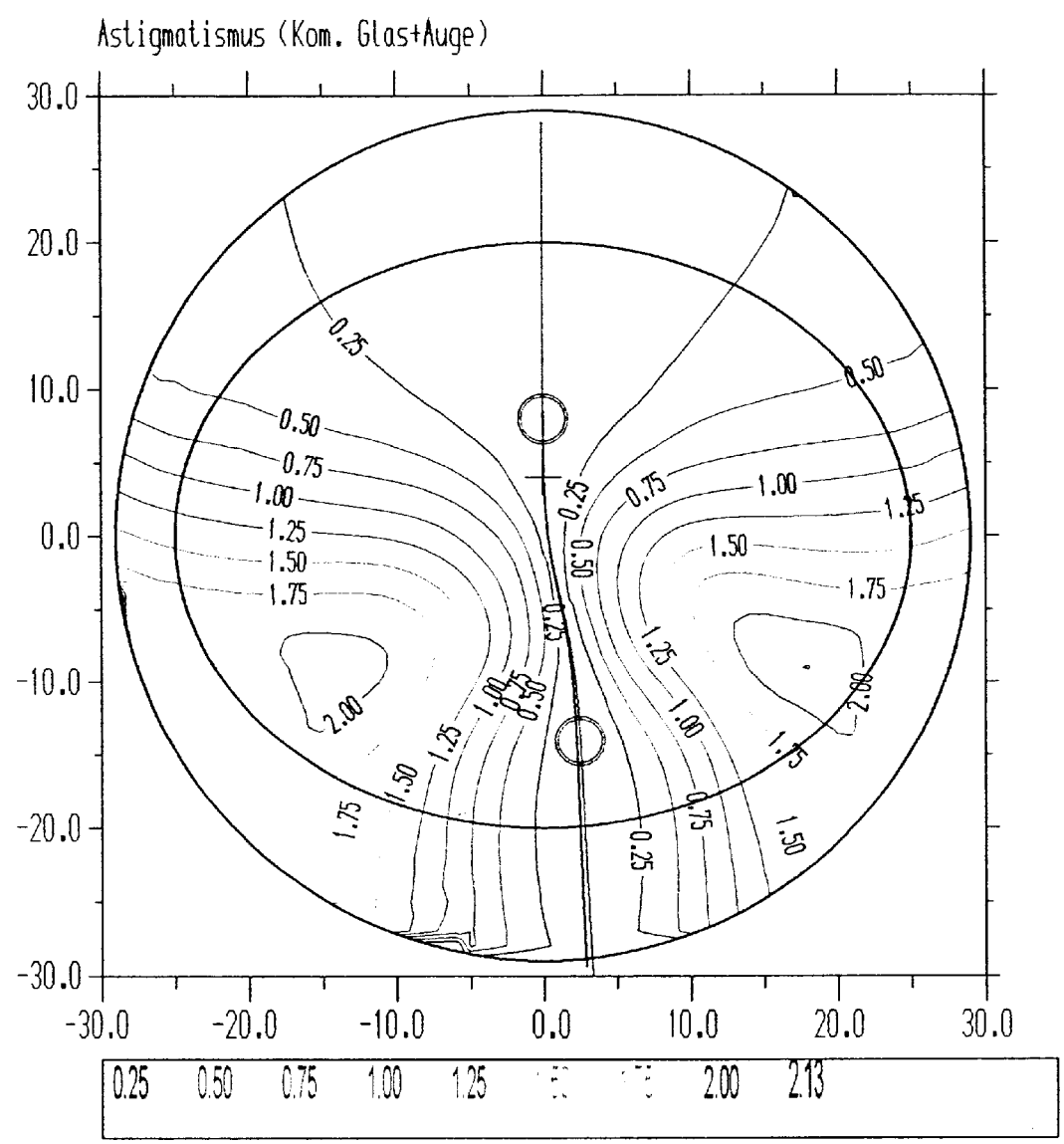
Figure 2C:
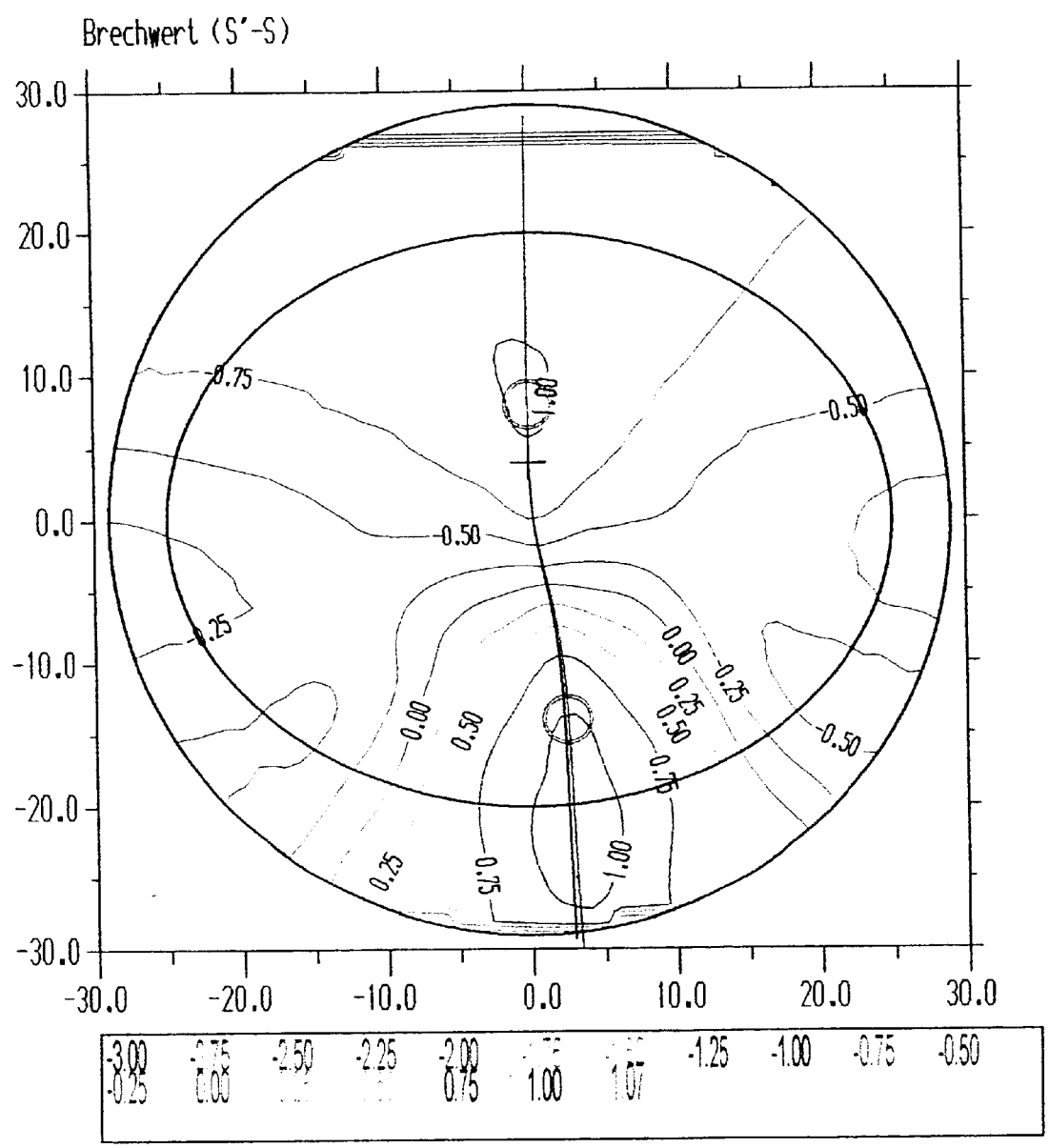
Figure 2D:
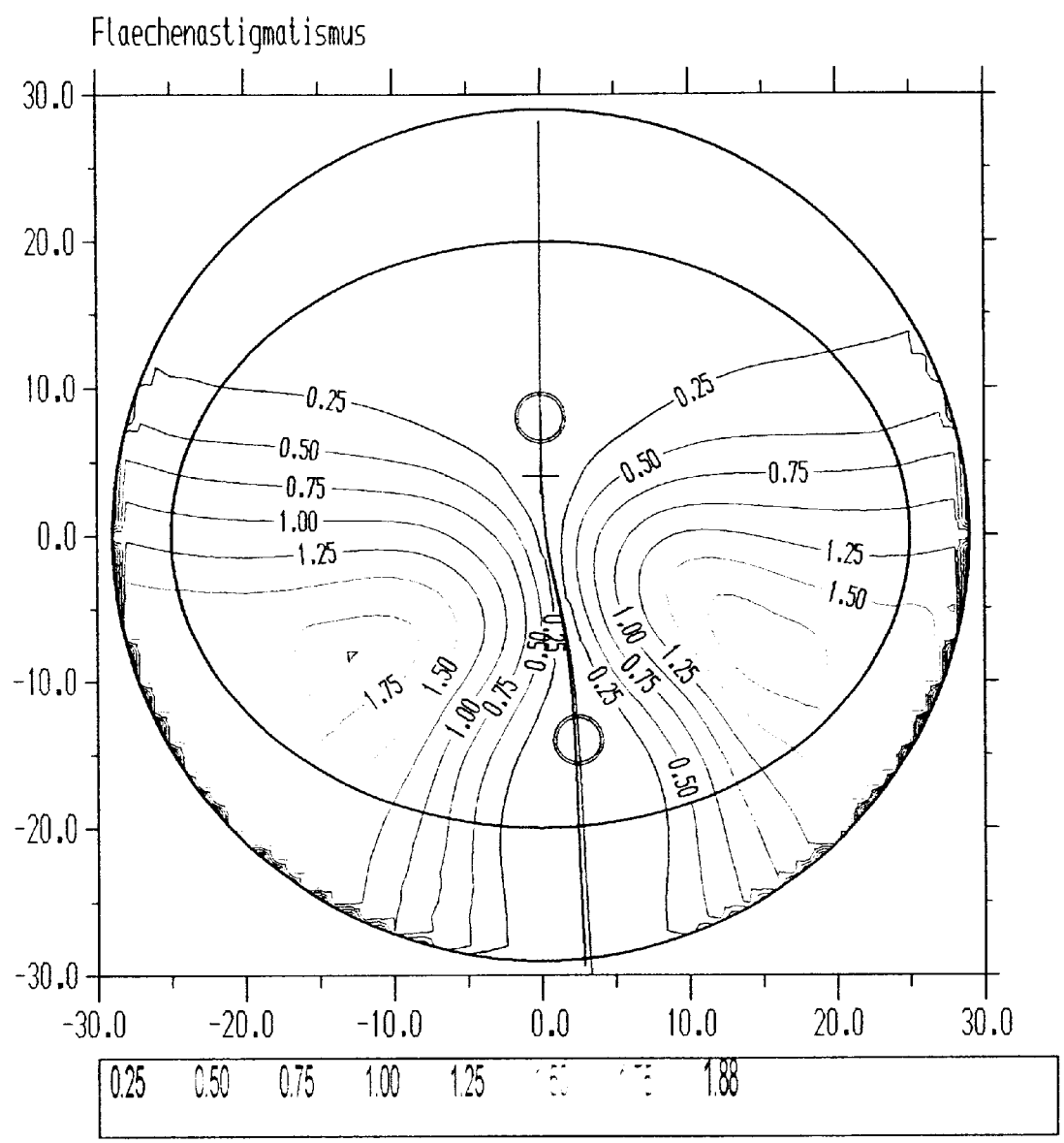
Figure 2E:
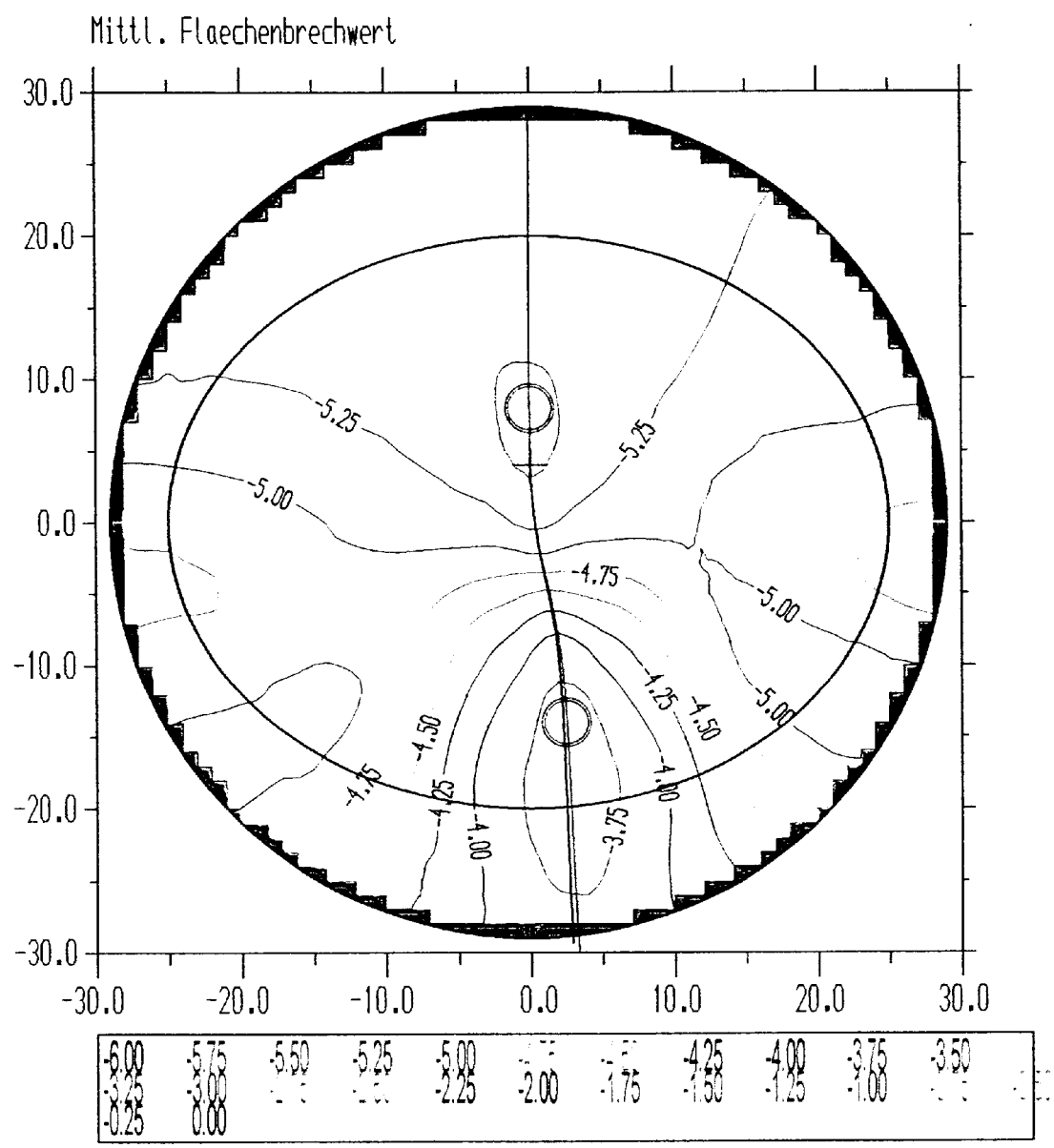
Figure 3B:
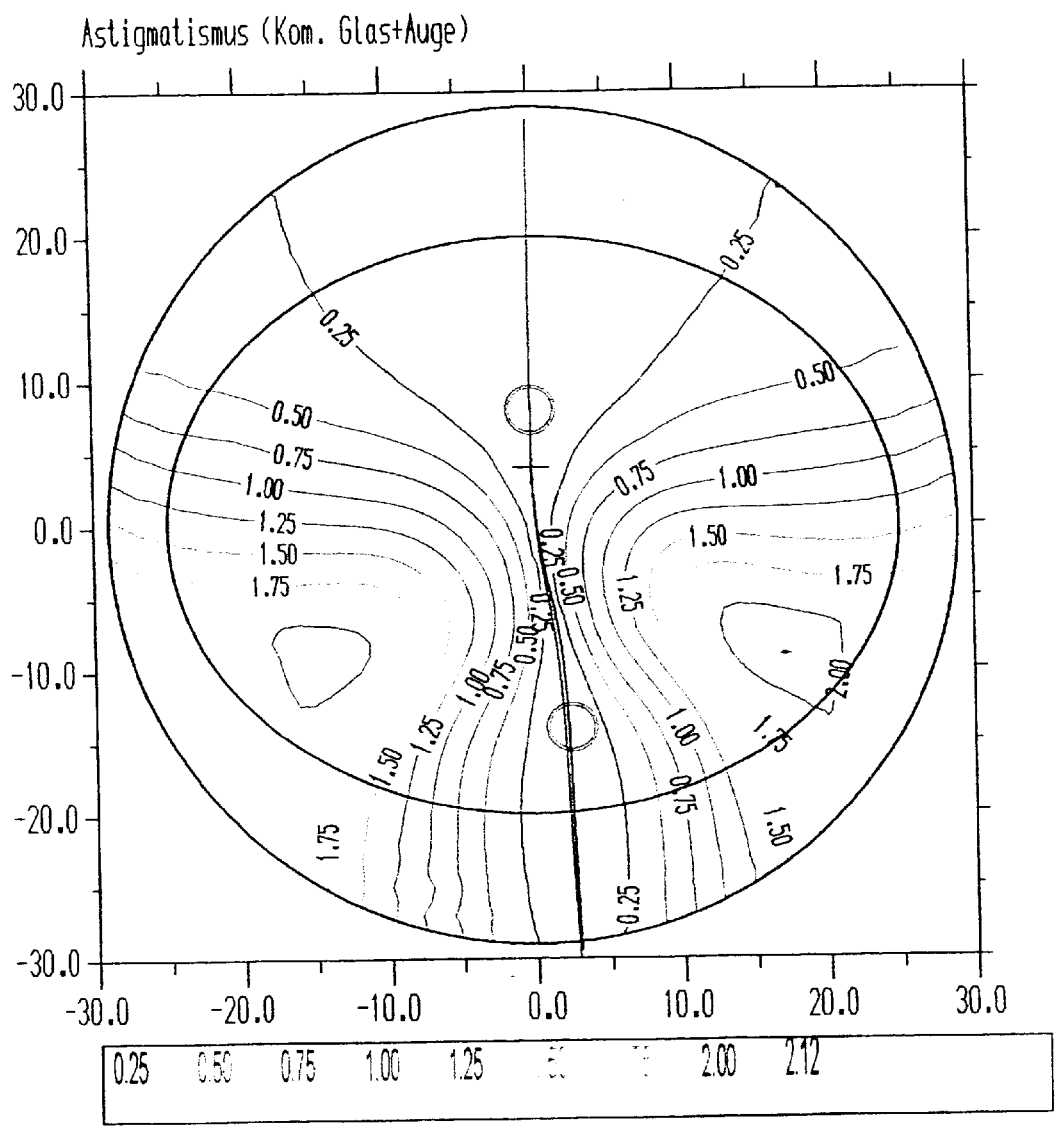
Figure 3C:
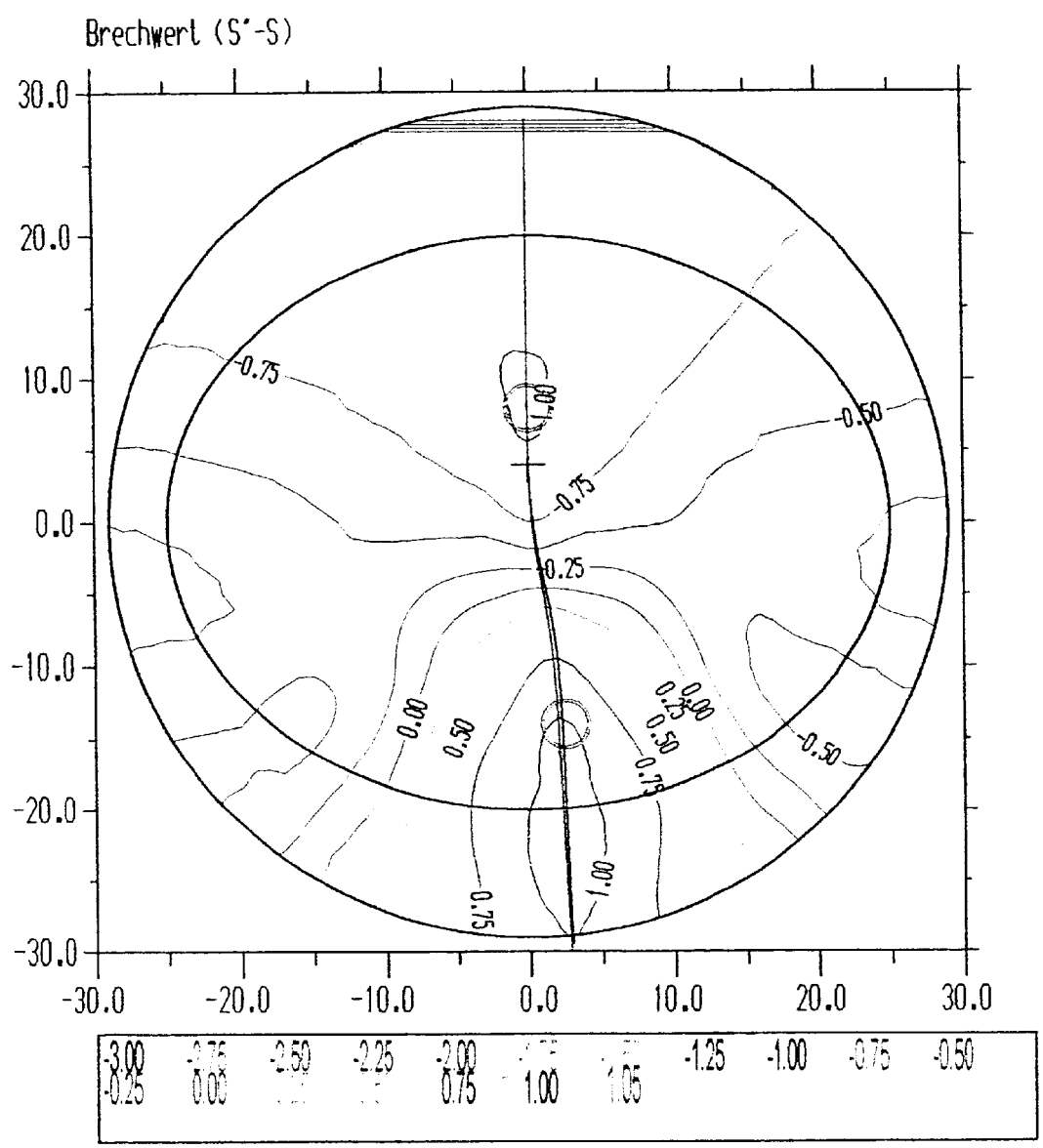
Figure 3D:
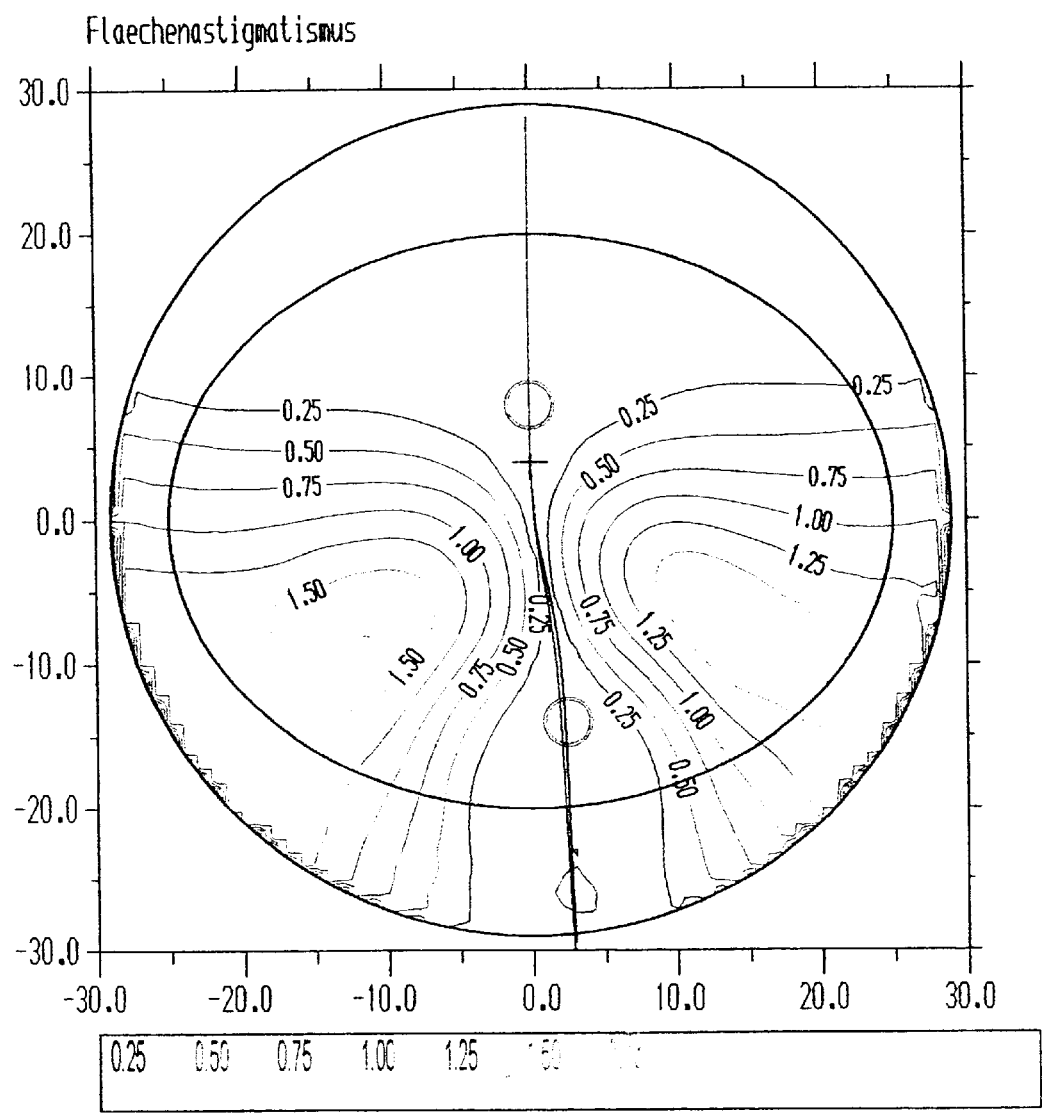
Figure 3E:
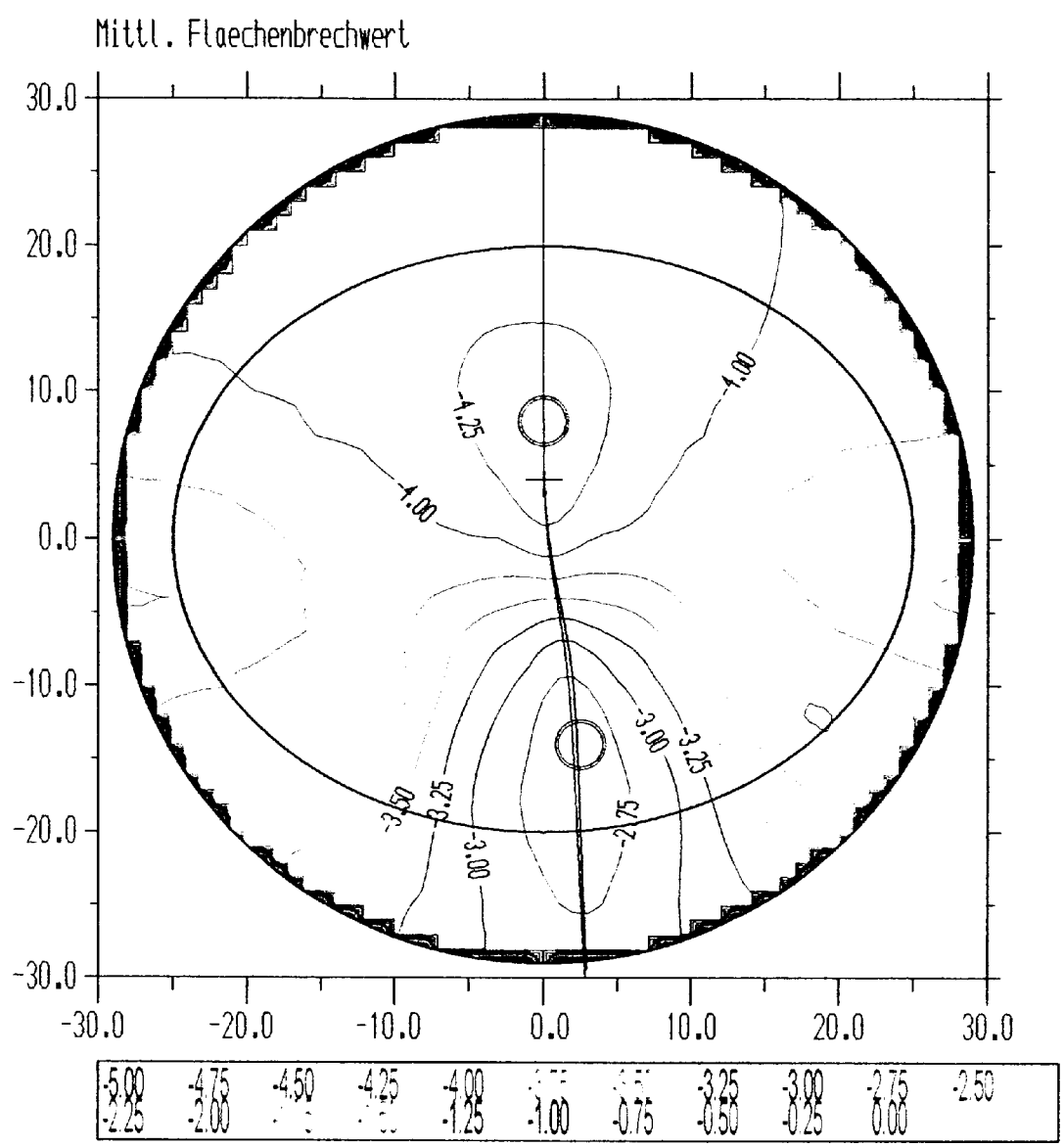
Figure 4B:
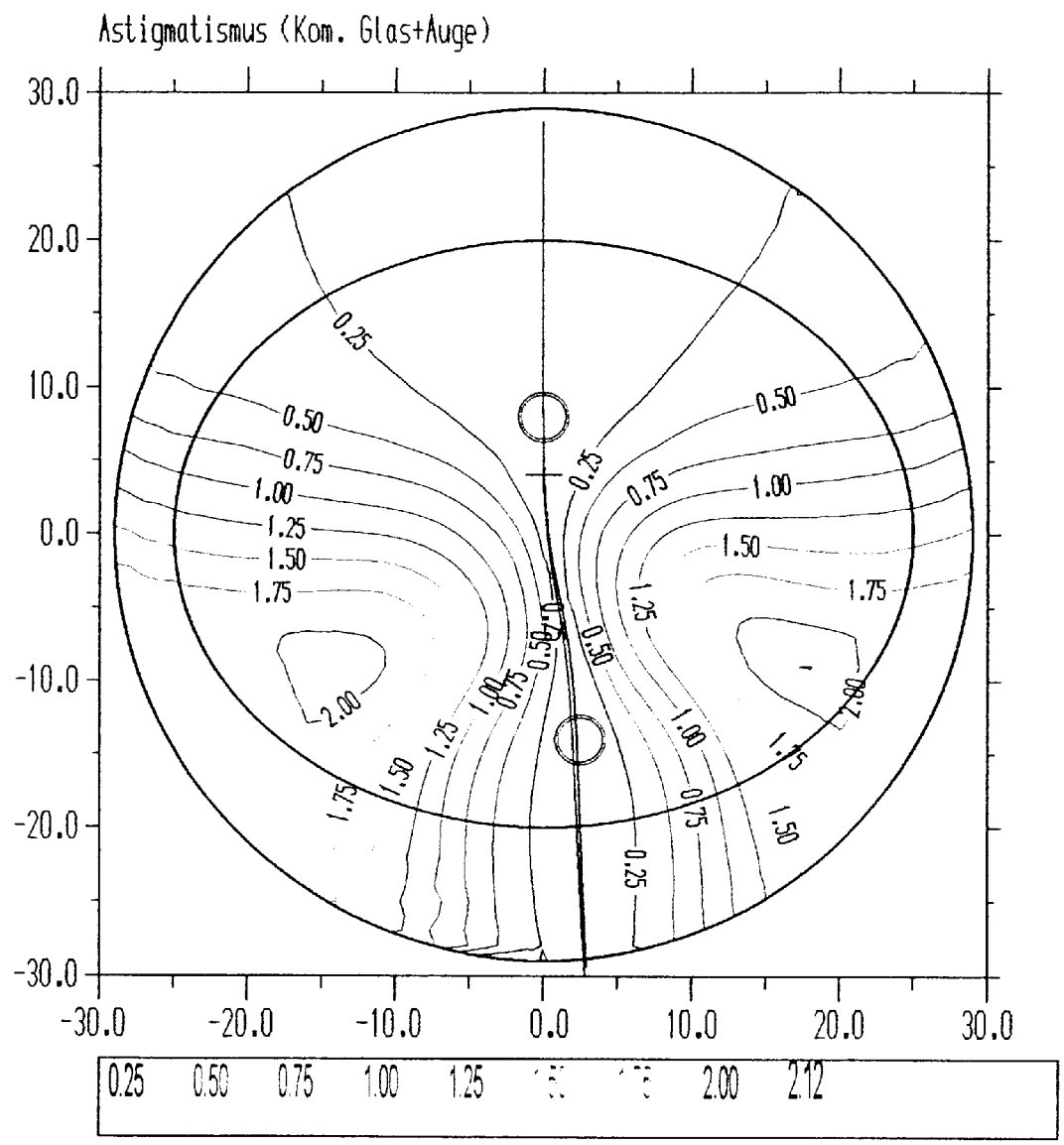
Figure 4C:
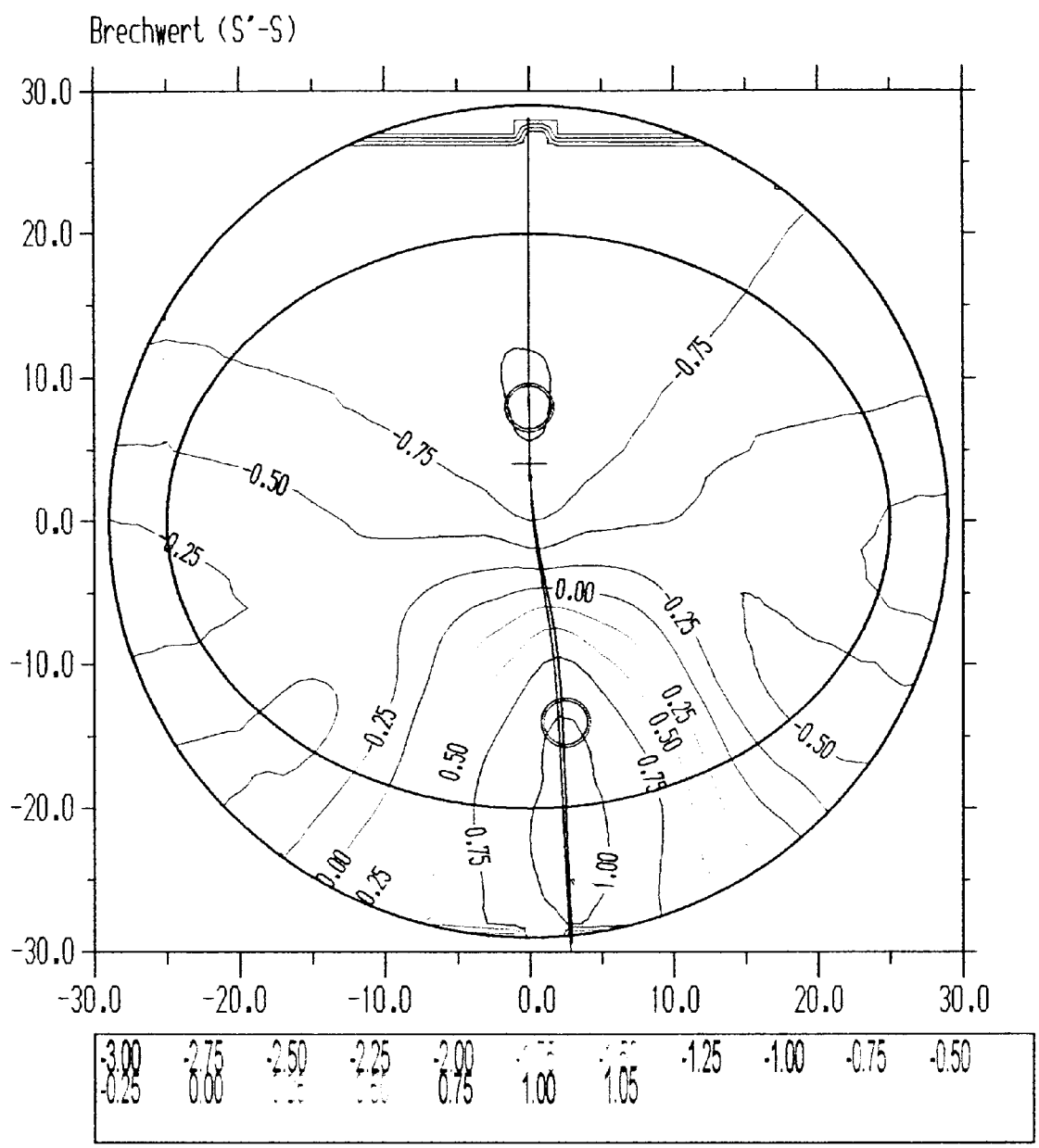
Figure 4D:
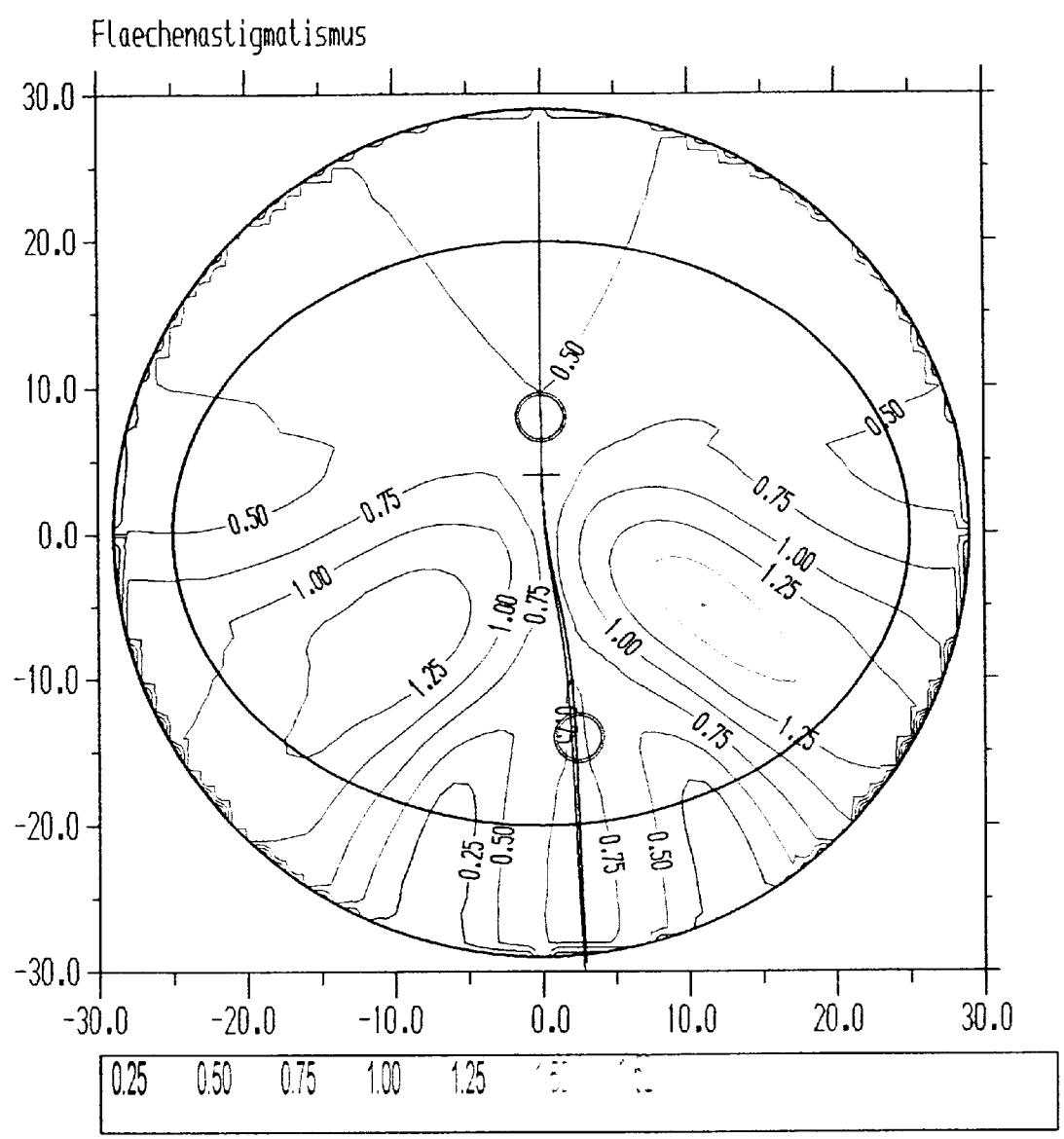
Figure 4E:
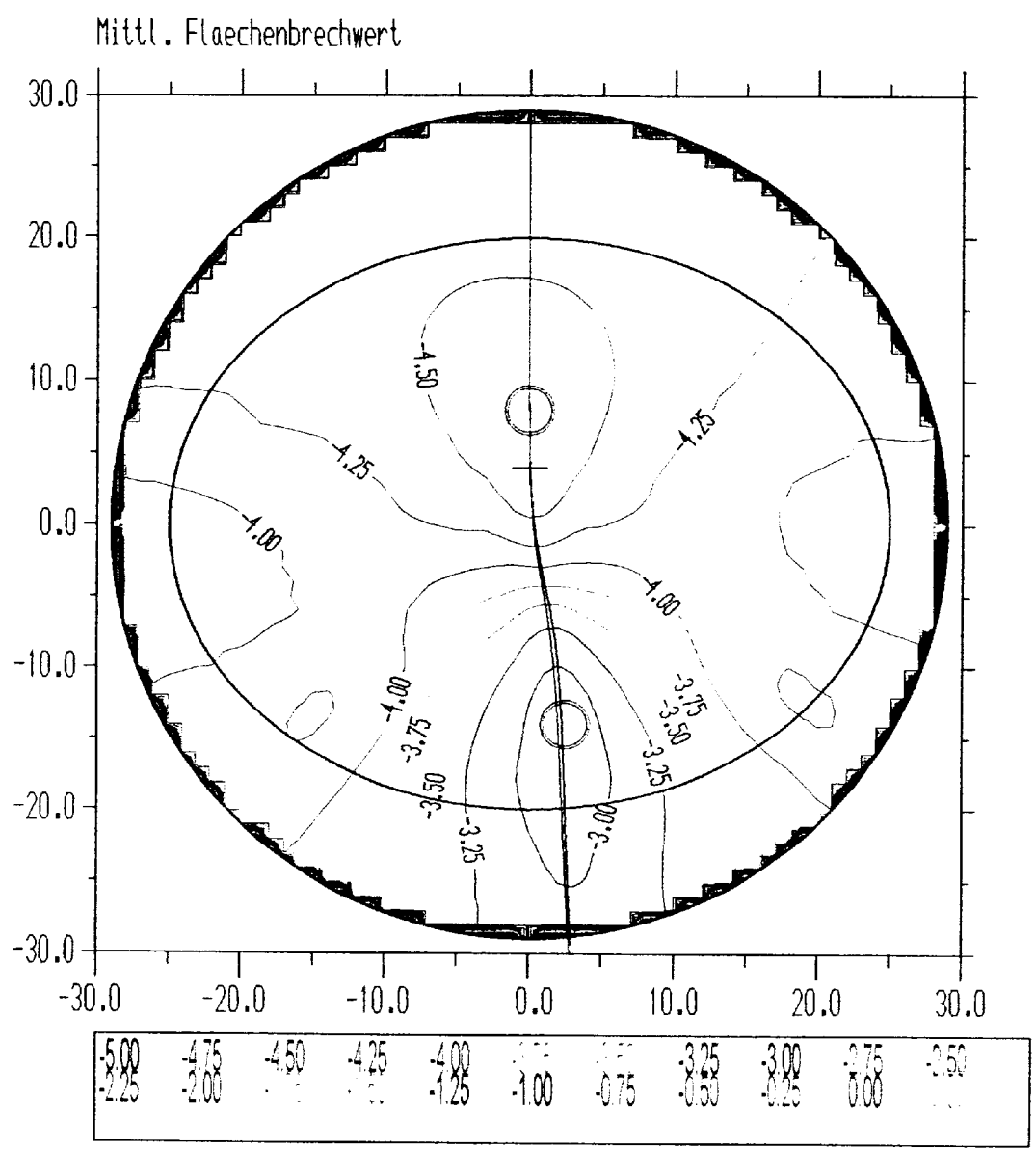

The sub-figures (b) in FIGS. 1 to 4 show the astigmatic variation inside a circle having the radius 30 mm and drawn about a point located 4 mm below the so-called centering cross. The astigmatic deviation is the "residual astigmatism" of the system consisting of the ophthalmic lens and the eye; it is illustrated by means of so-called iso lines, starting with iso line 0.25 dpt. The iso lines indicate the variation of the astigmatism in terms of amount and axial position from the cylindrical prescription —0 dpt in the case of an eye free of any astigmatism.

The sub-figures (c) show corresponding iso lines for the mean value in use of these embodiments of the invention. The mean value in use D is the mean value of the reciprocal values of the intersection widths S'1 and S'2 minus the object distance on the image side, i.e. of the intersection width S on the object side:

$$D=0.5*(S'1+S'2)-S$$

and is equally illustrated in the form of so-called iso lines, starting with iso line 0.75 dpt.

In the sub-figures d and e, the iso lines of the surface data—i.e. the surface astigmatism and the mean surface power—are illustrated correspondingly. For a definition of such surface data reference is made to the statements presented by way of introduction.

The four embodiments present the following individualized conditions of use:

| Example | 1 | 2 | 3 | 4 |
| --- | --- | --- | --- | --- |
| D1x | 4.55 | 4.55 | 3.41 | 3.41 |
| D1y | 4.55 | 4.55 | 3.41 | 3.98 |
| n | 1.597 | 1.597 | 1.597 | 1.597 |
| d | 1.59 | 1.59 | 1.59 | 1.59 |
| DRP | 1.0 | 1.0 | 1.0 | 1.0 |
| PD | 63 | 71 | 63 | 63 |
| HSA | 15 | 15 | 10 | 10 |
| forward inclination | 0 | 8 | 8 | 8 |

In the Table:

D1x=dioptric power of the face area in the x-direction (dpt)

D1y=dioptric power of the face area in the y-direction (dpt)

n=refractive index of the glass material d=center thickness of the ophthalmic lens in mm DRP=thickness of the reduction prism in cm/m PD=pupil distance in mm HSA=cornea/apex distance in mm forward inclination of the ophthalmic lens in degrees.

Despite the individualized conditions of use and despite the surface astigmatism of the face area, which has been adopted for cosmetic reasons in Example 4, the iso lines in the position of use do practically not differ from each other even though the surface values are partly clearly different.

The inventive methods can, of course, also be transferred to the computation and manufacture of ophthalmic lenses with two progressive surfaces and/or with (additional) varying refractive indices.

For determining the individual progression length, it is possible to proceed specifically as follows:

Here three different positions of an ophthalmic lens with fixed progression length ahead of the point of rotation of the eye Z' should be considered in correspondence with three different HSA levels.

In this Example, the forward inclination of the frame plane is 9 degrees while the distance between the point of rotation of the eye and the apex of the cornea, which is determined in correspondence with the DIN Standard, corresponds to 13.5 mm.

$B_F$ indicates the distant point of reference, $B_N$ identifies the point of reference in the near vision range; the progression length L is the distance between $B_F$ and $B_N$ and ZK represents the centering cross.

The optimum individual progression length is preferably computed on the basis of the following relationship:

With a progression length of 22 mm and an HSA value of 15 mm, the viewing angle α between the point of reference $B_N$ in the near vision range and the centering cross ZK for optimum reading in the point of reference in the near vision range corresponds to roughly 32.3 degrees in correspondence with the empirically determined position in use.

$$\tan(32.3°)=\text{distance}(B_N, ZK)/HSA+13.5 \text{ mm}).$$

Here, 13.5 mm is the DIN distance from the point of rotation of the eye to the apex of the cornea. Then applies:

$$L_{opt}=0.63*(HSA+13.5 \text{ mm})+d(B_F, ZK).$$

When the measured HSA value for a pre-adapted frame is used in the above formula the optimum individualized progression length of the continuous vision lens is obtained. With a distance of 4 mm between ZK and $B_F$ and with an HSA value of 20 mm an optimum progression length of 18.8 mm is achieved. This shows again the large range of variations from a standard progression length of 22 mm.

Additionally, the forward inclination of the frame plane and the prescription of the ophthalmic lens (sphere, cylinder, axis, prism, base) can also be considered in the computation.

What is claimed is:

1. Method of manufacturing spectacles comprising individual progressive ophthalmic lenses, comprising the following steps:

selection of a spectacle frame, detection of the shape of the lens rings with a precision better than ±0.5 mm in the x- and y-directions (data set 1), detecting the intersection points of the lines of sight through the plane of the lens rings for at least two design distances of the progressive ophthalmic lenses with a precision better than ±1 mm (data set 2), selection and positioning relative to the lens rings of a spherical or non-spherical surface in view of the prescription data, using the data sets 1 and 2 (data set 3), computing and positioning the progressive surface relative to the selected surface, with minimization of the critical thickness of the ophthalmic lens, using the data sets 1 to 3(data set 4), manufacturing the progressive surfaces as well as edges of the ophthalmic lenses from a non-edged semi-finished product finished on one side, using the data sets 1 to 4.

2. Method according to claim 1, characterized in that said spherical or non-spherical surface is the face surface.

3. Method according to claim 1, characterized in that the shape of the lens rings in the z-direction is detected with a precision better than ±0.5 mm for said data set 1.

4. Method according to claim 1, characterized in that in combination with the detection of the intersection pints of the lines of sight through the plane of said lens rings, the arrangement of the lens rings in front of the eyes of the wearer of the lenses is detected with a precision better than ±0.5 mm in the x-, y-, and z-directions (data set 2').

5. Method according to claim 2, characterized in that the face surface is selected as a function of the shape of the lens rings.

6. Method according to claim 4, characterized in that the face surface is a non-spherical surface.

7. Method according to claim 5, characterized in that the face surface comprises two differently configured principal sections whose design is selected as a function of the shape of the lens rings.

8. Method according to claim 1,
characterized in that said progressive surface compensates imaging errors of said second surface.

9. Method according to claim 1,
wherein at least one progressive surface is computed in consideration of individual data such as the cornea/apex distance etc. of the wearer of the lenses in such a way that in defined points of a principal line and particularly in the so-called distance reference point ($B_F$) and the close-range reference point ($B_N$), the ophthalmic lens produces a defined effect determined by a lens prescription,
characterized by the following steps:
the individual cornea/apex distance (HSA) in a pre-adapted spectacle frame selected by the lens wearer is measured,
the optimum individual progression length ($L_{opt}$) for the pre-adapted spectacle frame, i.e. the distance between the remote reference point and the close-range reference point in the direction of the vertical in the position of use is determined by means of the following relationship:

$$L_{opt} = \tan(32.3° \pm 1°)*(HSA + 13.5 \text{ mm}) + d(B_F, ZK)$$

wherein:
HSA: distance between the remote point of reference and the centering cross d(BF, ZK) distance selection of a spectacle frame,
the progressive surface of the ophthalmic lens is computed in such a way that the established individual progression length $L_{opt}$ is obtained, and
the ophthalmic lens is manufactured in correspondence with the computed data.

10. Method according to claim 9,
characterized in that the following relationship applies:

$$3 \text{ mm} \leq d(BF, ZK) \leq 5 \text{ m}$$

and particularly $$d(BF, ZK) = 4 \text{ mm}.$$

11. Method according to claim 9,
characterized in that the individual distance d between the remote point of reference point BF and the point of intersection of a straight line (0° viewing direction) through the frame plane, which passes through the point of rotation of the eyes Z' in a horizontal direction, and a centering cross ZK is established for determining the value of $d(B_F, ZK)$.

12. Method according to claim 9,
characterized in that further individual values are considered in the determination of the value of the optimum individual progression length ($L_{opt}$).

13. Method according to claim 12,
characterized in that a further individual value is the advance inclination of the frame plane.

14. Method according to claim 12,
characterized in that further individual values are the spherical effect, the additive effect, the astigmatic effect and the axial position as well as the prism and the prism base.

15. Method according to claim 9,
characterized by the following assignment between the cornea/apex distance HSA and the individual progression length $L_{opt}$:

| HSA | $L_{opt}$ |
|---|---|
| 10 mm | 18.8 mm |
| 15 mm | 22 mm |
| 20 mm | 25.1 mm. |

16. Method according to claim 9,
characterized in that the computation of the ophthalmic lens and of the progressive surface in particular is carried out in the position of use.

* * * * *